United States Patent
Ginder et al.

(10) Patent No.: US 6,295,863 B1
(45) Date of Patent: Oct. 2, 2001

(54) METHOD AND APPARATUS FOR DETERMINING SEAL FAILURE IN A BALL JOINT

(75) Inventors: John Matthew Ginder, Plymouth; William McMurray Stewart, Livonia, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/625,590

(22) Filed: Jul. 26, 2000

(51) Int. Cl.[7] .................................................... G01M 3/04
(52) U.S. Cl. ..................................... 73/40; 73/46; 403/27
(58) Field of Search ................................. 73/40, 46, 49.7, 73/49.8; 703/27; 324/664, 665

(56) References Cited

U.S. PATENT DOCUMENTS

| | | | |
|---|---|---|---|
| 3,960,457 | * 6/1976 | Gaines et al. ........................... | 403/27 |
| 4,070,121 | * 1/1978 | Graham .................................. | 403/27 |
| 4,128,831 | 12/1978 | Rensch et al. . | |
| 4,346,591 | * 8/1982 | Evans ..................................... | 73/151 |
| 4,679,957 | 7/1987 | Bauer . | |
| 4,848,950 | * 7/1989 | Haberstroh ............................. | 403/12 |
| 5,069,461 | * 12/1991 | Orlowski ................................ | 277/25 |
| 5,179,347 | 1/1993 | Hawkins . | |
| 5,345,821 | 9/1994 | Reich et al. . | |
| 5,449,017 | 9/1995 | Collins et al. . | |
| 5,586,611 | * 12/1996 | Dorosz .................................. | 175/369 |
| 5,804,721 | 9/1998 | Yankielun et al. . | |
| 5,837,884 | * 11/1998 | Kimura et al. ......................... | 73/25.4 |
| 5,916,854 | * 6/1999 | Inaya et al. ........................... | 508/452 |
| 6,196,057 | * 3/2001 | Discenzo ............................. | 73/54.01 |

OTHER PUBLICATIONS

The American Heritage® Dictionary of the English Language, Third Edition copyright© 1992 by Houghton Mifflin Company. Electronic version licensed from INSO Corporation.*

McGraw–Hill Encyclopedia of Physics, 1983, McGraw–Hill, Inc, p. 230.*

* cited by examiner

*Primary Examiner*—Hezron Williams
*Assistant Examiner*—C D Garber
(74) *Attorney, Agent, or Firm*—Gregory P. Brown

(57) ABSTRACT

A method of determining seal failure is implemented in a ball joint including a stud having a ball embedded in grease within a sealed socket assembly. A dielectric characteristic of the grease is measured to determined if the sealed socket assembly has failed based upon a substantial variation of the measured dielectric characteristic from a predetermined value.

11 Claims, 2 Drawing Sheets

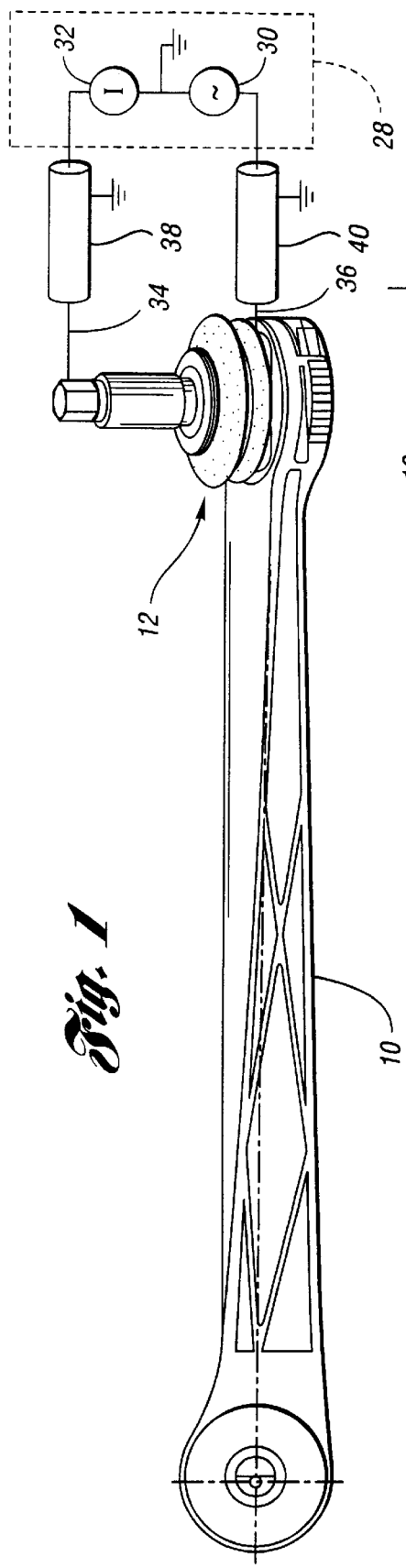
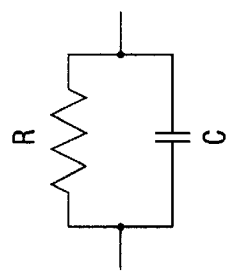
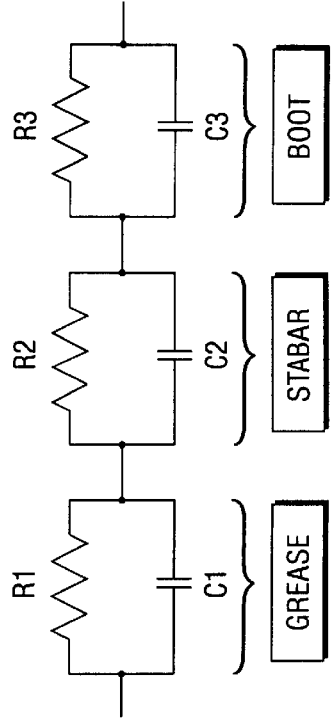
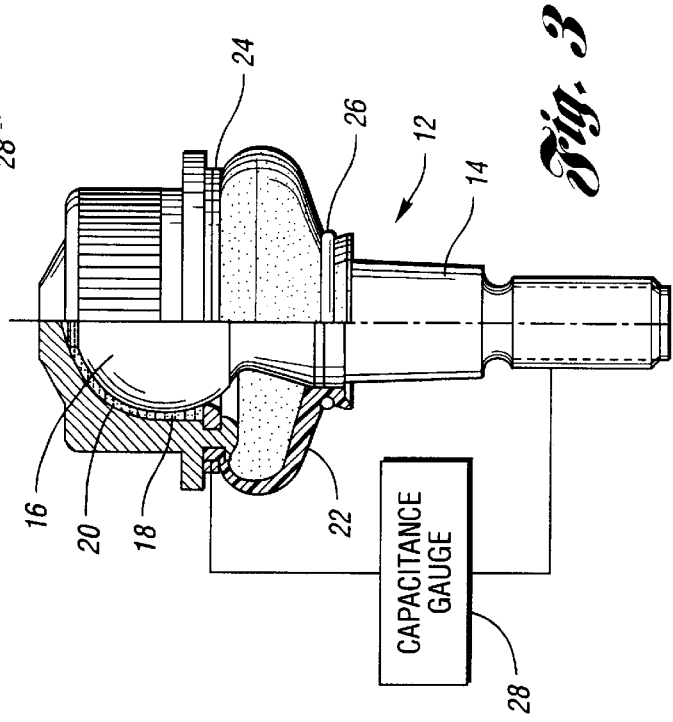

METHOD AND APPARATUS FOR DETERMINING SEAL FAILURE IN A BALL JOINT

TECHNICAL FIELD

The present invention relates to a method of determining sealing failure in a ball joint by sensing changes in a dielectric characteristic of the ball joint grease.

BACKGROUND OF THE INVENTION

Ball joints are commonly used in numerous vehicle applications, such as stabilizer bar links, suspension control arms, tie rod ends, etc. These ball joints are typically positioned underneath the vehicle and exposed to the elements such that they are subject to seal failure and leakage.

Ball joints used in vehicles require oscillation and rotation between the parts they connect. This motion requires the use of an elastomeric seal between the ball joint stud and socket. Water leakage around elastomeric ball joint boots and into suspension stabilizer bar ball joints, or other ball joints, can cause corrosion of the ball, failure of the ball joint, and other problems. Under current tests or service procedures, water leakage can only be detected after the fact by a time-consuming and destruction tear-down of the ball joint. This destructive tear-down of the ball joint is obviously undesirable, particularly when the ball joint has not failed.

Accordingly, it is desirable to provide an improved method and apparatus for determining ball joint leakage in a manner which does not require tear-down of the ball joint.

DISCLOSURE OF INVENTION

Accordingly, the present invention provides an improved method and apparatus for determining seal failure in a ball joint by measuring changes in a dielectric characteristic of the ball joint grease to determine if such changes are indicative of failure of the ball joint seal.

More specifically, the present invention provides a method of determining seal failure in a ball joint, including a stud having a ball embedded in grease within a sealed socket assembly. The method includes the steps of: a) measuring a dielectric characteristic of the grease; and b) determining that the sealed socket assembly has failed if the measured dielectric characteristic substantially varies from a predetermined value.

The measured dielectric characteristic may be capacitance or resistance. In a preferred embodiment, the capacitance is measured by connecting a capacitance gauge to the stud and to a clamping ring which secures a rubber boot around the socket assembly. The measuring step may include periodically monitoring the dielectric characteristic with an in-vehicle control module, or connecting a capacitance gauge to the ball joint in a vehicle service environment. In other words, the capacitance gauge may be integral with the ball joint assembly and operatively connected to a vehicle control system, or the capacitance gauge may be selectively connected to determine sealing integrity of the ball joint.

An apparatus in accordance with the invention includes a stud having a ball at a distal end thereof, and a sealed socket having grease therein. The ball is embedded within the grease. A capacitance gauge is operatively connected across the grease to measure changes in capacitance of the grease which would indicate seal failure. The capacitance may be measured in real-time on the vehicle.

Accordingly, an object of the invention is to provide an improved method and apparatus for determining seal failure in a ball joint in a manner in which tear-down of the ball joint is not required.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a schematic perspective view of a stabilizer bar and ball joint connected to a capacitance gauge in accordance with the present invention;

FIG. 2a shows a schematic illustration of a circuit having a resistor and capacitor in parallel;

FIG. 2b shows a schematic circuit diagram in accordance with the present invention;

FIG. 3 shows a cut-away side view of a ball joint assembly in accordance with the invention;

DETAILED DESCRIPTION OF THE PREFERRED EMBODIMENT

Figure 4:
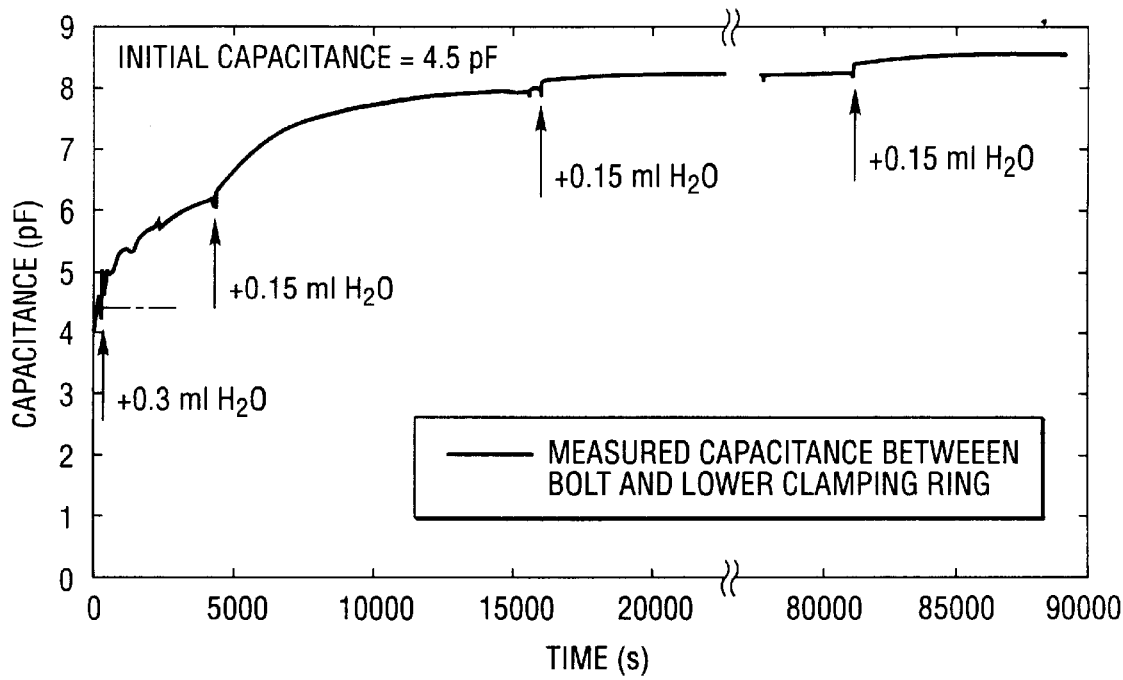
FIG. 4 shows a graphical illustration of capacitance vs. time as measured in a test environment.

The present invention provides a convenient method and apparatus for monitoring water leakage into ball joint assemblies non-invasively, and potentially in real-time, using dielectric measurements. The inventors have demonstrated in a test environment that the capacitance between, for example, the ball bolt or stud and the lower clamping ring that retains the rubber boot onto the ball joint housing is sensitive to the amount of water inside the boot.

The measurement geometry is shown in FIG. 1.

FIG. 1 illustrates a stabilizer bar link 10 having a ball joint assembly 12 at a distal end thereof. As shown in more clearly in FIG. 3, the ball joint assembly 12 includes a stud 14 with a ball 16 at a distal end thereof. The ball 16 is embedded in grease 18 within the socket 20, which may be integral with the stabilizer bar link 10 shown in FIG. 1. An elastomeric boot 22 is secured by lower and upper clamping rings 24,26 to seal the socket 20. A capacitance gauge is connected at opposing ends to the stud 14 and to the lower clamping ring 24. As shown in FIG. 1, the capacitance gauge 28 includes a voltage source 30 and a current meter 32.

As shown schematically in FIG. 1, the leads 34,36 are shielded from electromagnetic interference by shields 38,40. The shielding of the signal lines 34,36 is generally necessary to enhance noise immunity and minimize the effects of stray capacitance.

Accordingly, an AC voltage is applied between the clamping ring 24 and the stud 14, and the corresponding capacitive current is measured by an AC ammeter 32.

The dielectric or electrical properties of many objects are often approximated by a parallel combination of a resistor and a capacitor, as shown in FIG. 2a. If this circuit is driven by a sinusoidally varying electrical current $I_0 \sin(\omega t)$, where $\omega = 2\pi f$ and f is the electrical frequency, the resulting voltage drop across the circuit will be phase shifted somewhat from that of the applied current. The in-phase or real component of the voltage is given by $$V_{re} = \frac{R}{1+\omega^2 R^2 C^2} I_0;$$

note that the electric RC time constant controls the frequency dependence of the voltage. Note also that for low frequencies such that $\omega\ll1/(RC)$, the voltage is controlled by the circuit resistance, $V_{re}\approx RI_0$, as expected from Ohm's law. The out-of-phase or imaginary component of the voltage is then given by $$V_{im} = \frac{R^2 C\omega}{1+\omega^2 R^2 C^2} I_0;$$

At high frequencies such that $\omega\gg1/(RC)$, the out-of-phase voltage is controlled by the circuit capacitance: $V_{im}\approx I_0/(\omega C)$. If both $V_{re}$ and $V_{im}$ are measured at known frequencies, the above pair of equations can be solved for R and C. Alternatively, a sinusoidal voltage can be applied, and the real and imaginary components of the current can be measured to infer R and C. These procedures describe how many impedance analyzers work, and may be used to determine the apparent capacitance of a ball joint assembly.

A more realistic description of the dielectric behavior of the ball joint assembly is more complicated. Specifically, three different dielectric materials—the grease, the ball joint socket (a polymer composite), and the elastomeric boot—are in series between the two metal electrodes used to measure the capacitance. This electrical circuit could be modeled as shown in FIG. 2b.

In FIG. 2b, R1 and C1 describe the electrical properties of the grease, R2 and C2 describe those of the socket, and R3 and C3 describe those of the boot. We expect that only R1 and C1 vary with water content, since the socket and boot should not absorb water. Since they are in series, the voltage drops across these three materials are additive. The imaginary part of the voltage drop across the grease, for example, would be given by $I_0 R1^2 C1\omega(1+\omega^2 R1^2 C1^2)$. In this fashion, the change in $V_{re}$ and $V_{im}$ across the ball joint assembly could then be connected to changes in R1 and C1, the changes in electrical properties of the grease.

In test measurements, a 1 volt RMS sinusoidal voltage at a frequency of 1 kHz was applied to the lower clamping ring 24. The corresponding capacitive current induced on the stud 14 was measured using a locking amplifier (a sensitive AC ammeter 32). Commercial capacitance gauges, available from various suppliers such as Hewlett-Packard, could also be used for this measurement. For purely capacitive currents, the capacitance is determined by the ratio of the (RMS or peak) induced current I to the applied voltage V:

$$C=I/(2\pi fV)$$

where f is the frequency.

Figure 5:
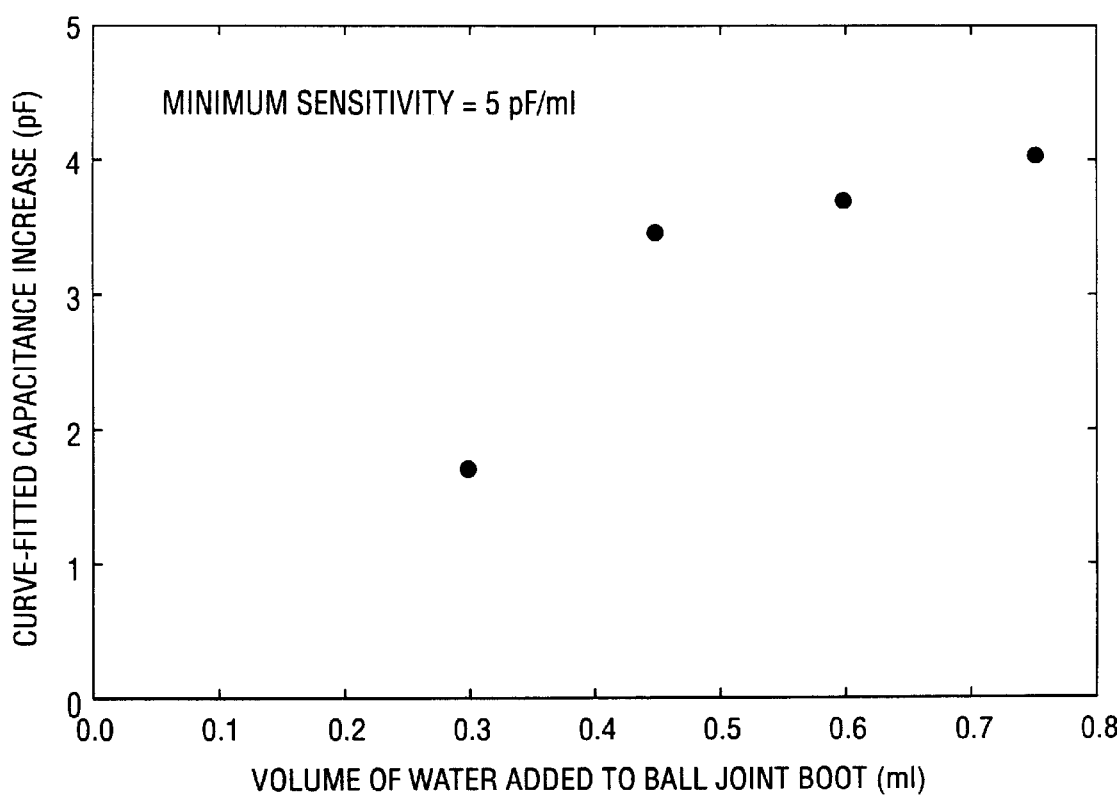
FIG. 5 is a graphical illustration of capacitance increase vs. volume of water corresponding with the data of FIG. 4.

The increase in capacitance as deionized water is injected into the rubber boot 22 was recorded and is plotted in FIG. 4. Before water is injected into the boot 22, the capacitance is very stable and is roughly 4.5 pF. As water is injected, the capacitance increases and eventually almost doubles after a total of 0.75 milliliters of water was added. The capacitance increase is not instantaneous, which probably reflects the time required for water to be transported within the boot (i.e., mixed with the grease). Moreover, the capacitance increase appears to vary nonlinearly with the amount of water added, as FIG. 5 illustrates. FIG. 5 was developed by curve-fitting the data of FIG. 4. As shown, cumulative capacitance increases as a function of the cumulative water added to the boot.

The nonlinear increase in capacitance with the amount of water added may be a saturation effect; the capacitance increase plateaus as water fills that part of the boot that yields the greatest increase in capacitance. Alternatively, it could simply reflect that measurements were taken before the water was fully transported into all regions of the boot. In any event, the sensitivity implied by these measurements is at least 5 picofarads per millimeter of water. Since commercial capacitance gauges possess femtofarad ($10^{-15}$ F) sensitivity, the presence of water at the submicroliter level should, in principle, be detectable.

These measurements were performed on a stabilizer bar link in a laboratory environment. It is expected that this technique should be applicable to monitoring of ball joints mounted in operational vehicles, especially since it involves AC electrical measurements at a known frequency. The determined capacitance can be compared with a calibrated value, a predetermined expected valve, or with a prior measurement to look for substantial variation in the capacitance which would indicate a seal failure (i.e., leakage of the boot). The determination may be made, for example, every time the ignition is turned on.

This technique is sensitive to the presence of water over some volume enclosed by the boot, and not only to water at a single isolated location. If it is needed, the region that contributes most to the capacitive signal could be estimated using finite element analysis or other techniques.

The capacitance is also somewhat sensitive to the angle that the bolt makes with respect to the housing; rotating the bolt from its nominal position to the position of maximum tilt increases the capacitance by about 10%. Thus, real-time in-vehicle monitoring of water leakage, if desired, may require some averaging of the capacitive signal over time to remove any variations due to bolt angle.

It is understood that the capacitance gauge could be connected across various locations on the ball joint assembly to detect changes in dielectric characteristics of the grease. Also, special purpose electrodes could be brought into proximity of the boot or the ball housing to serve as measuring electrodes.

In another embodiment, a miniaturized capacitive sensor (such as an array of interdigitated metal fingers) may be positioned inside the ball area itself to contact the grease. A hole in the housing or bolt would have to be drilled in order to locate the sensor. With this sensor, more local information such as location of water penetration could be obtained.

While the best mode for carrying out the invention has been described in detail, those familiar with the art to which this invention relates will recognize various alternative designs and embodiments for practicing the invention within the scope of the appended claims.

What is claimed is:

1. A method of determining seal failure in a ball joint including a stud having a ball embedded in grease within a sealed socket assembly, the method comprising:
    measuring a dielectric characteristic of the grease;
    determining that the sealed socket assembly has failed if the measured dielectric characteristic substantially varies from a predetermined value;
    wherein said step of measuring a dielectric characteristic comprises measuring capacitance of the grease; and
    wherein said step of measuring capacitance of the grease comprises connecting a capacitance gauge to the stud and to the socket assembly.

2. The method of claim 1, wherein said step of measuring a dielectric characteristic comprises measuring resistance of the grease.

3. The method of claim 1, wherein said connecting to the socket assembly comprises connecting to a lower clamping ring which secures a rubber boot around the socket assembly.

4. The method of claim 1, wherein said step of measuring a dielectric characteristic comprises monitoring the dielectric characteristic by periodically sensing for changes in the dielectric characteristic.

5. The method of claim 1, wherein said determining step comprises sensing an increase in capacitance.

6. A method of sensing water leakage into a ball joint including a stud having a ball embedded in grease within a sealed socket assembly, the method comprising:

measuring a dielectric characteristic of the grease;

determining that water has leaked into the ball joint if the measured dielectric characteristic substantially varies from a predetermined value;

wherein said step of measuring a dielectric characteristic comprises measuring capacitance of the grease; and wherein said step of measuring capacitance of the grease comprises connecting a capacitance gauge to the stud and to the socket assembly.

7. The method of claim 6, wherein said step of measuring a dielectric characteristic comprises measuring resistance of the grease.

8. The method of claim 6, wherein said connecting to the socket assembly comprises connecting to a lower clamping ring which secures a rubber boot around the socket assembly.

9. The method of claim 6, wherein said step of measuring a dielectric characteristic comprises monitoring the dielectric characteristic by periodically sensing for changes in the dielectric characteristic.

10. The method of claim 6, wherein said determining step comprises sensing an increase in capacitance.

11. A ball joint assembly comprising:

a stud having a ball at an end thereof;

a socket having grease therein, within which the ball is embedded;

a rubber boot sealing the socket; and a capacitance gauge operatively connected across the grease for determining capacitance changes of the grease indicative of water leakage into the socket;

wherein the capacitance gauge is connected to the stud and to a clamping ring which secures the rubber boot over the socket.

* * * * *